June 2, 1959  L. R. LAWTER  2,888,772
BAIT IMPALING RETAINER FOR FISHHOOKS
Filed March 21, 1957
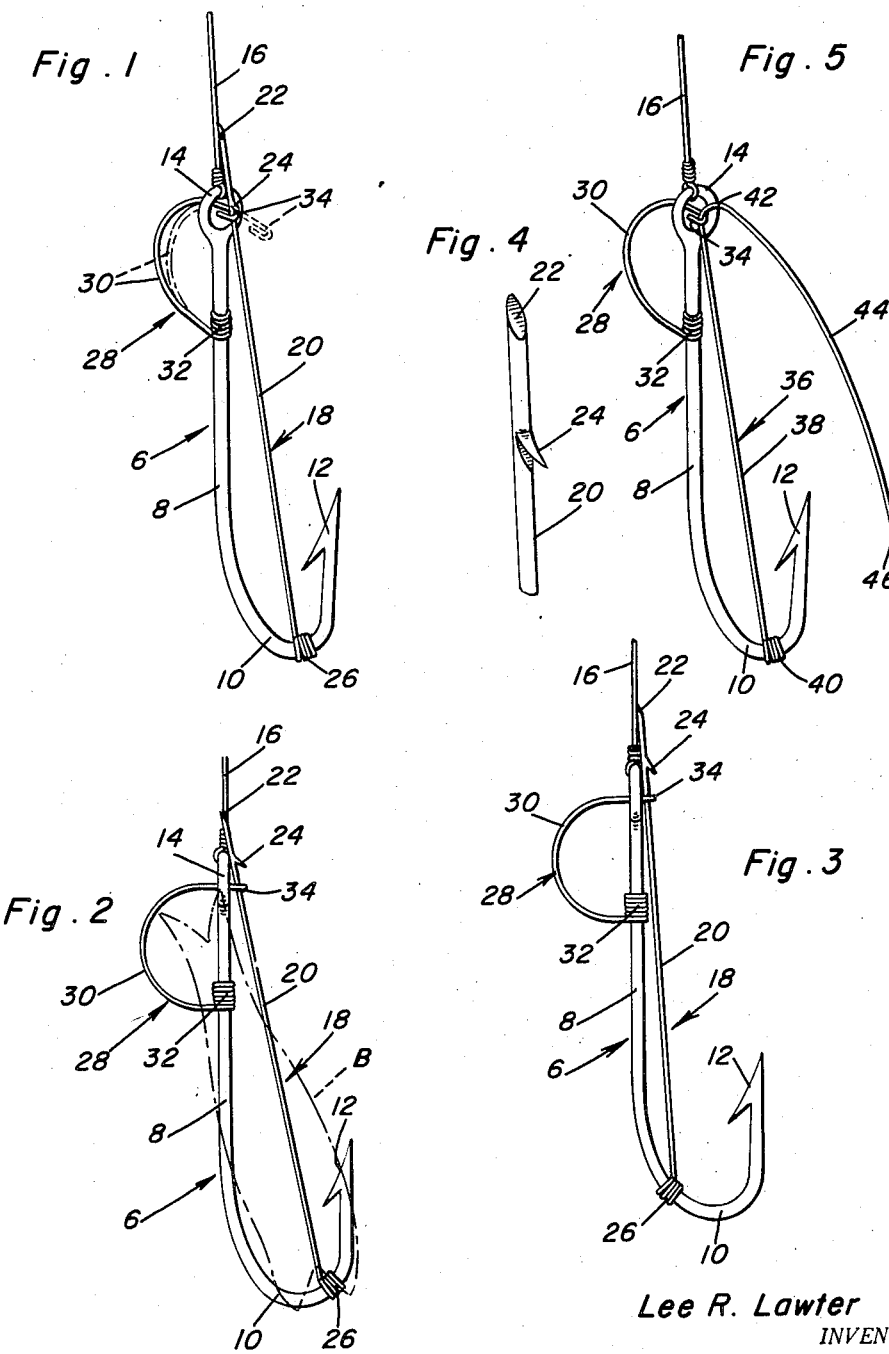
Lee R. Lawter
INVENTOR.
BY *Clarence A. O'Brien*
*and Harvey B. Jacobson*
Attorneys

2,888,772

BAIT IMPALING RETAINER FOR FISHHOOKS

Lee R. Lawter, South Miami, Fla., assignor of forty-eight percent to Ezra R. Lawter, Miami, Fla.

Application March 21, 1957, Serial No. 647,619

3 Claims. (Cl. 43—43.2)

The present invention relates to live bait holders and retainers wherein the retaining member is of relatively small cross-sectional size and is adapted to be forcibly pressed through the live bait in a manner to retain the bait in proper relationship to the barbed hook on a conventional fishing hook.

As is evident from the preceding general statement of the invention, there are many and varied styles and forms of bait retainer attachments. A typical one is disclosed, for example, in the patent to Raney R. Allen, 2,503,573 of April 11, 1950. The provision of a needle-like or an equivalent impaling member one end of which is operatively attached to the usual bend on the fishing hook is old in the Allen patent. The instant invention pertains to an adaptation which, while analogous to the stated patent, is directed to desirable improvements.

One improvement has to do with a C-shaped or equivalent latch. This latch is operatively mounted on the eye-equipped end of the shank of the fishing hook and has a resilient free end portion provided with a U-shaped keeper hook which is releasably engageable with an adjacent portion of the impaling member.

Another improvement involves the construction stated and wherein the impaling member is provided with a barb or an equivalent element which not only assists in holding the live bait on the member but also brings about a most satisfactory and reliable cooperation between the keeper hook and impaling member.

An additional improvement is predicated on an impaling member which has a return bend or extension at its free end portion which is longitudinally bowed and which is intended to cooperate with the barbed bend of the fishing hook to cooperate therewith in providing a weed guard.

Other objects, features, and advantages will become more readily apparent from the following description and the accompanying drawing.

In the drawing:

Fig. 1 is a perspective view of a fishhook and the improved bait impaling and retaining means thereon;

Fig. 2 is a side elevation of the same showing, in phantom lines, the manner in which the live bait is applied and held in fishing position;

Fig. 13 is a side elevation which shows how the coiled end of the retainer may be slid in a direction away from the barbed hook to better expose the latter when a strike is had;

Fig. 4 is a fragmentary view on an enlarged scale of the free end of the impaling retainer or member; and Fig. 5 is a perspective view similar to Fig. 1 wherein a modified retaining member is shown.

In all of the figures the fishhook, which is conventional, is denoted by the numeral 6 and this comprises the usual shank 8 with a return bend 10 terminating in a barbed hook 12. The eye 14 at the other end of the shank serves to accommodate the fishing line 16.

The live bait impaling member (also called a finger, prong, or needle) is denoted by the numeral 18 and comprises a length of resilient wire of suitable cross-sectional gauge having a substantially straight portion 20 which is opposed to the shank and is of a length so that the upper end (Figs. 1 to 4 inclusive) 22 extends close to and above the eye. It is beveled or pointed at this end to facilitate piercing and passing through the live bait. There is also a suitable barb or shoulder 24 provided inwardly of the pointed end. The lower end is formed with coil means 26 which is shiftable from right to left (see Figs. 2 and 3) in an obvious manner. That is to say, when the bait B is impaled, the impaling member is in the position seen in Fig. 2 which positions the headed end of the bait in close proximity to the barbed hook and tends to conceal the barb. When a strike is had the coil means may be shifted by sliding around the bend and when this occurs the barbed hook is exposed to facilitate making the catch.

The latch means 28 comprises a short piece of resilient wire of suitable gauge bent upon itself between its ends into general C-shaped form as at 30. One end is fashioned into coils 32 embracing the shank below the eye 14. The other free end is formed into a U-shaped keeper hook 34 which is releasably engageable below the barb 24 with the springy free end portion of the impaling member 20.

The latch 28 of the keeper 34 is used in both forms of the invention. In fact, there is but a minor difference in the modification of the concept seen in Fig. 5. That is to say, in Fig. 5 the impaling member 36 comprises a resilient length of wire 38 having coil means 40 slidingly mounted on the bend 10 but in this arrangement the intermediate portion of the member is bent upon itself as at 42 to provide a return bend 44 terminating in a pointed end portion 46 to pierce the bait (not shown). In this arrangement by using this return bend and properly bowing the portion 44 the latter is disposed outwardly of the barbed hook and is given the additional function of a weed guard.

This attachment makes it possible for the fisherman to use almost any kind of live fish bait, such as shrimp, minnows and so on. The bait will stay alive for an appreciable period of time and results are reliable and recurrently effective.

Recapitulating, the invention has to do with a live bait holder but can also be used for numerous kinds of fish bait, such as cut mullet, shrimp, worms (for bottom fishing), strips of rinds for trolling and/or other practices known to the individual fisherman. More fish can be easily caught by using this attachment because the bait serves to protect the fishhook from snagging as so often occurs.

The trolling bait can be adjusted on the holder in the same manner as shown in Figure 2 with the upper end fastened to the needle above the barb. This secures the bait in the right position.

Since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a fishhook having a shank provided at one end with a line attaching eye and at the other end with a bend terminating in a barbed hook, a live bait impaling member having one end attached to said bend and having a portion located close to said eye, and a C-shaped resilient wire latch having one end coiled about said shank near said eye and a free end formed into a U-shaped hook and passing through said eye, said hook being disposed beyond said eye and adapted to engage an adjacent portion of said impaling member.

2. The structure defined as in claim 1 and wherein a portion of said impaling member adjacent to said U-shaped hook is provided with a barb-like bait retaining shoulder, said hook being releasably cooperable with said shoulder.

3. The structure defined in claim 1 and wherein a portion of the impaling member beyond said U-shaped hook is bent upon itself, is extended downwardly in a direction away from said eye and is fashioned into a longitudinally bowed return-bend which is disposed adjacent to and cooperates with the barbed hook and constitutes a weed guard.

References Cited in the file of this patent

UNITED STATES PATENTS

| | | |
|---|---|---|
| 254,313 | Hemming | Feb. 28, 1882 |
| 852,793 | Ladish | May 7, 1907 |
| 1,261,601 | Ore | Apr. 2, 1918 |
| 2,503,573 | Allen | Apr. 11, 1950 |